(12) United States Patent
Zhao et al.

(10) Patent No.: US 9,708,214 B2
(45) Date of Patent: Jul. 18, 2017

(54) INORGANIC FIBER WITH IMPROVED SHRINKAGE AND STRENGTH

(71) Applicant: UNIFRAX I LLC, Tonawanda, NY (US)

(72) Inventors: Donghui Zhao, Tonawanda, NY (US); Bruce K. Zoitos, Williamsville, NY (US); Michael J. Andrejcak, Tonawanda, NY (US); Jason M. Hamilton, Lancaster, NY (US)

(73) Assignee: Unifrax I LLC, Tonawanda, NY (US)

(*) Notice: Subject to any disclaimer, the term of this patent is extended or adjusted under 35 U.S.C. 154(b) by 0 days.

(21) Appl. No.: 14/580,400

(22) Filed: Dec. 23, 2014

(65) Prior Publication Data
US 2016/0017519 A1 Jan. 21, 2016

Related U.S. Application Data

(60) Provisional application No. 62/025,142, filed on Jul. 16, 2014.

(51) Int. Cl.
| | | |
|---|---|---|
| *C03C 13/00* | (2006.01) | |
| *B29C 47/00* | (2006.01) | |
| *C03C 13/06* | (2006.01) | |
| *C04B 35/622* | (2006.01) | |
| *C04B 35/626* | (2006.01) | |
| *F16L 59/02* | (2006.01) | |
| *B29K 505/00* | (2006.01) | |
| *B29K 509/08* | (2006.01) | |
| *B29K 509/00* | (2006.01) | |

(52) U.S. Cl.
CPC .......... *C03C 13/00* (2013.01); *B29C 47/0014* (2013.01); *C03C 13/001* (2013.01); *C03C 13/06* (2013.01); *C04B 35/6224* (2013.01); *C04B 35/62665* (2013.01); *B29K 2505/00* (2013.01); *B29K 2509/00* (2013.01); *B29K 2509/08* (2013.01); *C04B 2235/3203* (2013.01); *C04B 2235/3206* (2013.01); *C04B 2235/3208* (2013.01); *C04B 2235/3217* (2013.01); *C04B 2235/3244* (2013.01); *C04B 2235/3272* (2013.01); *C04B 2235/5252* (2013.01); *C04B 2235/5264* (2013.01); *C04B 2235/72* (2013.01); *F16L 59/028* (2013.01)

(58) Field of Classification Search
CPC ....... C03C 13/00; C03C 13/001; C03C 13/06; D01F 9/08; D10B 2101/02; F16L 59/028; B29C 47/0014; B29K 2505/00; D03D 15/12
See application file for complete search history.

(56) References Cited

U.S. PATENT DOCUMENTS

| | | | |
|---|---|---|---|
| 1,759,919 A | 5/1930 | Singer | |
| 2,051,279 A | 8/1936 | Thorndyke | |
| 2,335,220 A | 11/1943 | Edwards | |
| 2,576,312 A | 11/1951 | Minnick | |
| 2,690,393 A | 9/1954 | McGarvey | |
| 2,693,668 A | 11/1954 | Slayter | |
| 2,699,415 A | 1/1955 | Nachtman | |
| 2,710,261 A | 6/1955 | McMullen | |
| 2,876,120 A | 3/1959 | Machlan | |
| 2,877,124 A | 3/1959 | Welsh | |
| 3,112,184 A | 11/1963 | Hollenbach | |
| 3,166,428 A | 1/1965 | Thomas | |
| 3,348,994 A | 10/1967 | Rees et al. | |
| 3,380,818 A | 4/1968 | Smith | |
| 3,383,275 A | 5/1968 | Croop et al. | |
| 3,402,055 A | 9/1968 | Harris et al. | |
| 3,455,731 A | 7/1969 | Nielsen et al. | |
| 3,458,329 A | 7/1969 | Owens et al. | |
| 3,459,568 A | 8/1969 | Rinehart | |
| 3,469,729 A | 9/1969 | Grekila et al. | |
| 3,597,179 A | 8/1971 | Simmons | |
| 3,687,850 A | 8/1972 | Gagin | |
| 3,783,092 A | 1/1974 | Majumdar | |
| 3,785,836 A | 1/1974 | Bacon | |

(Continued)

FOREIGN PATENT DOCUMENTS

| | | |
|---|---|---|
| CA | 1 271 785 A | 7/1990 |
| CA | 2017344 | 11/1990 |

(Continued)

OTHER PUBLICATIONS

Shelby, J.E., Introduction to Glass Science and Technology, 1997, The Royal Society of Chemistry, p. 109.*

(Continued)

*Primary Examiner* — Elizabeth A Bolden
(74) *Attorney, Agent, or Firm* — Curatolo Sidoti Co., LPA; Salvatore A. Sidoti; Floyd Trillis, III

(57) ABSTRACT

An inorganic fiber containing silica and magnesia as the major fiber components and which further includes intended addition of lithium oxide to improve the thermal stability of the fiber. The inorganic fiber exhibits good thermal performance at 1260° C. and greater, low linear shrinkage, retains mechanical integrity after exposure to the use temperature, and exhibits low biopersistence in physiological fluids. Also provided are thermal insulation product forms prepared from a plurality of the inorganic fibers, methods of preparing the inorganic fiber and of thermally insulating articles using thermal insulation prepared from a plurality of the inorganic fibers.

83 Claims, No Drawings

(56) References Cited

U.S. PATENT DOCUMENTS

| | | | |
|---|---|---|---|
| 3,788,885 A | 1/1974 | Birchall et al. |
| 3,799,836 A | 3/1974 | Rogers et al. |
| 3,804,608 A | 4/1974 | Gaskell et al. |
| 3,804,646 A | 4/1974 | Dumbaugh, Jr. |
| 3,811,901 A | 5/1974 | Bacon |
| 3,854,986 A | 12/1974 | Chvalovsky et al. |
| 3,887,386 A | 6/1975 | Majumdar |
| 3,899,342 A | 8/1975 | Birchall et al. |
| 3,900,329 A | 8/1975 | Grubb et al. |
| 3,904,424 A | 9/1975 | Aoki et al. |
| 3,985,935 A | 10/1976 | Brodmann |
| 3,992,498 A | 11/1976 | Morton et al. |
| 4,002,482 A | 1/1977 | Coenen |
| 4,011,651 A | 3/1977 | Bradbury et al. |
| 4,036,654 A | 7/1977 | Yale et al. |
| 4,037,015 A | 7/1977 | Koike et al. |
| 4,078,939 A | 3/1978 | Schwochow |
| 4,102,692 A | 7/1978 | Schartau et al. |
| 4,104,355 A | 8/1978 | Dunn et al. |
| 4,118,239 A | 10/1978 | Gagin et al. |
| 4,194,914 A | 3/1980 | Moriya et al. |
| 4,243,421 A | 1/1981 | Kume |
| 4,303,722 A | 12/1981 | Pilgrim |
| 4,317,575 A | 3/1982 | Cavicchio et al. |
| 4,330,628 A | 5/1982 | Cockram et al. |
| 4,345,430 A | 8/1982 | Pallo et al. |
| 4,358,500 A | 11/1982 | George et al. |
| 4,363,878 A | 12/1982 | Yamamoto et al. |
| 4,366,251 A | 12/1982 | Rapp |
| 4,375,493 A | 3/1983 | George et al. |
| 4,379,111 A | 4/1983 | Smith et al. |
| 4,382,104 A | 5/1983 | Smith et al. |
| 4,387,180 A | 6/1983 | Jen et al. |
| 4,396,661 A | 8/1983 | George et al. |
| 4,428,999 A | 1/1984 | George et al. |
| 4,461,840 A | 7/1984 | Massol |
| 4,492,722 A | 1/1985 | Ritter, II et al. |
| 4,507,355 A | 3/1985 | George et al. |
| 4,542,106 A | 9/1985 | Sproull |
| 4,547,403 A | 10/1985 | Smith |
| 4,558,015 A | 12/1985 | Ekdahl et al. |
| 4,563,219 A | 1/1986 | George et al. |
| 4,604,097 A | 8/1986 | Graves et al. |
| 4,613,577 A | 9/1986 | Tagai et al. |
| 4,615,988 A | 10/1986 | Le Moigne et al. |
| 4,659,610 A | 4/1987 | George et al. |
| 4,673,594 A | 6/1987 | Smith |
| 4,735,857 A | 4/1988 | Tagai et al. |
| 4,737,192 A | 4/1988 | Smith |
| 4,778,499 A | 10/1988 | Beaver |
| 4,820,573 A | 4/1989 | Tagai et al. |
| 4,830,989 A | 5/1989 | Trivedi et al. |
| 4,867,779 A | 9/1989 | Meunier et al. |
| 4,882,302 A | 11/1989 | Horiuchi et al. |
| 4,933,307 A | 6/1990 | Marshall et al. |
| 5,037,470 A | 8/1991 | Matzen et al. |
| 5,055,428 A | 10/1991 | Porter |
| 5,064,785 A | 11/1991 | Kawamoto et al. |
| 5,108,957 A | 4/1992 | Cohen et al. |
| 5,145,734 A | 9/1992 | Ito et al. |
| 5,221,558 A | 6/1993 | Sonuparlak et al. |
| 5,223,336 A | 6/1993 | Griffith et al. |
| 5,250,488 A | 10/1993 | Thelohan et al. |
| 5,284,807 A | 2/1994 | Komori et al. |
| 5,312,806 A | 5/1994 | Mogensen |
| 5,332,699 A | 7/1994 | Olds et al. |
| 5,346,575 A | 9/1994 | Griffith et al. |
| 5,346,868 A | 9/1994 | Eschner |
| 5,371,050 A | 12/1994 | Belitskus et al. |
| 5,384,188 A | 1/1995 | Lebold et al. |
| 5,389,716 A | 2/1995 | Graves |
| 5,401,693 A | 3/1995 | Bauer et al. |
| 5,420,087 A | 5/1995 | Wieland et al. |
| 5,480,676 A | 1/1996 | Sonuparlak et al. |
| 5,486,232 A | 1/1996 | Griffith et al. |
| 5,552,213 A | 9/1996 | Eschner |
| 5,569,629 A | 10/1996 | TenEyck et al. |
| 5,576,252 A | 11/1996 | Rapp et al. |
| 5,580,532 A | 12/1996 | Robinson et al. |
| 5,583,080 A | 12/1996 | Guldberg et al. |
| 5,585,312 A | 12/1996 | TenEyck et al. |
| 5,591,516 A | 1/1997 | Jaco et al. |
| 5,603,887 A | 2/1997 | Eschner |
| RE35,557 E | 7/1997 | Thelohan et al. |
| 5,714,421 A | 2/1998 | Olds et al. |
| 5,811,360 A | 9/1998 | Jubb |
| 5,821,183 A | 10/1998 | Jubb |
| 5,843,854 A | 12/1998 | Karppinen et al. |
| 5,858,465 A | 1/1999 | Hunt et al. |
| 5,874,375 A * | 2/1999 | Zoitos ............... C03C 13/00 501/36 |
| 5,928,075 A | 7/1999 | Miya et al. |
| 5,932,500 A | 8/1999 | Jensen et al. |
| 5,935,886 A | 8/1999 | Jensen et al. |
| 5,955,389 A | 9/1999 | Jubb |
| 5,962,354 A | 10/1999 | Fyles et al. |
| 5,968,648 A | 10/1999 | Rapp et al. |
| 5,994,247 A | 11/1999 | Jubb et al. |
| 5,998,315 A | 12/1999 | Jubb |
| 6,013,592 A | 1/2000 | Merrill et al. |
| 6,025,288 A | 2/2000 | Zoitos et al. |
| 6,030,910 A | 2/2000 | Zoitos et al. |
| 6,036,762 A | 3/2000 | Sambasivan |
| 6,037,284 A | 3/2000 | Holstein et al. |
| 6,037,288 A | 3/2000 | Robinson et al. |
| 6,043,170 A | 3/2000 | Steinkopf et al. |
| 6,156,683 A | 12/2000 | Grove-Rasmussen et al. |
| 6,180,546 B1 | 1/2001 | Jubb et al. |
| 6,284,684 B1 | 9/2001 | Vignesoult et al. |
| 6,309,994 B1 | 10/2001 | Marra et al. |
| 6,313,050 B1 | 11/2001 | De Meringo et al. |
| 6,346,494 B1 | 2/2002 | Jensen et al. |
| 6,358,872 B1 | 3/2002 | Karppinen et al. |
| 6,458,436 B1 | 10/2002 | Hansen et al. |
| 6,461,415 B1 | 10/2002 | Sambasivan et al. |
| 6,517,906 B1 | 2/2003 | Economy et al. |
| 6,551,951 B1 | 4/2003 | Fay et al. |
| 6,652,950 B2 | 11/2003 | Barney et al. |
| 6,716,407 B2 | 4/2004 | Davis et al. |
| 6,855,298 B2 | 2/2005 | Teneyck |
| 6,861,381 B1 | 3/2005 | Jubb et al. |
| 6,897,173 B2 | 5/2005 | Bernard et al. |
| 6,953,757 B2 | 10/2005 | Zoitos et al. |
| 7,153,796 B2 | 12/2006 | Jubb et al. |
| 7,160,824 B2 | 1/2007 | Zguris et al. |
| 7,259,118 B2 | 8/2007 | Jubb et al. |
| 7,468,336 B2 | 12/2008 | Zoitos et al. |
| 7,468,337 B2 | 12/2008 | Zoitos et al. |
| 7,470,641 B2 | 12/2008 | Jubb et al. |
| 7,550,118 B2 | 6/2009 | Merry |
| 7,567,817 B2 | 7/2009 | Liu et al. |
| 7,638,447 B2 | 12/2009 | Bernard et al. |
| 7,651,965 B2 | 1/2010 | Jubb et al. |
| 7,704,902 B2 | 4/2010 | Maquin et al. |
| 7,709,027 B2 | 5/2010 | Fechner et al. |
| 7,781,043 B2 | 8/2010 | Nakayama et al. |
| 7,781,372 B2 | 8/2010 | Liu et al. |
| 7,803,729 B2 | 9/2010 | Keller et al. |
| 7,875,566 B2 | 1/2011 | Freeman et al. |
| 7,887,917 B2 | 2/2011 | Zoitos et al. |
| 7,897,255 B2 | 3/2011 | Liu et al. |
| 8,026,190 B2 | 9/2011 | Keller et al. |
| 8,147,952 B2 | 4/2012 | Iwamoto et al. |
| 8,163,377 B2 | 4/2012 | Wainwright et al. |
| 8,551,897 B2 | 10/2013 | Zoitos et al. |
| 8,877,102 B2 | 11/2014 | Bernard et al. |
| 2002/0022567 A1 | 2/2002 | Li et al. |
| 2002/0032116 A1 | 3/2002 | Jubb et al. |
| 2002/0107133 A1 | 8/2002 | Troczynski et al. |
| 2003/0015003 A1 | 1/2003 | Fisler et al. |
| 2003/0049329 A1 | 3/2003 | Lee et al. |
| 2003/0138673 A1 | 7/2003 | Sambasivan et al. |
| 2003/0162019 A1 | 8/2003 | Zoitos et al. |
| 2004/0011245 A1 | 1/2004 | Sambasivan et al. |

(56) References Cited

U.S. PATENT DOCUMENTS

| | | | |
|---|---|---|---|
| 2004/0092379 A1 | 5/2004 | Lewis | |
| 2005/0032620 A1 | 2/2005 | Zoitos et al. | |
| 2005/0079970 A1 | 4/2005 | Otaki et al. | |
| 2005/0085369 A1 | 4/2005 | Jensen | |
| 2005/0268656 A1 | 12/2005 | Raichel et al. | |
| 2006/0094583 A1* | 5/2006 | Freeman | C04B 35/62665 501/36 |
| 2006/0211562 A1 | 9/2006 | Fisler | |
| 2007/0020454 A1 | 1/2007 | Zoitos et al. | |
| 2008/0191179 A1 | 8/2008 | Bernard et al. | |
| 2009/0053510 A1 | 2/2009 | Jubb | |
| 2009/0130937 A1 | 5/2009 | Wainwright et al. | |
| 2010/0093510 A1 | 4/2010 | Tanaka et al. | |
| 2010/0184581 A1 | 7/2010 | Berthereau et al. | |
| 2010/0209306 A1 | 8/2010 | Kunze et al. | |
| 2010/0298110 A1 | 11/2010 | Richter et al. | |
| 2011/0118102 A1 | 5/2011 | Zoitos et al. | |
| 2011/0172077 A1 | 7/2011 | Lewis | |
| 2013/0225025 A1* | 8/2013 | McGinnis | C03C 3/087 442/180 |
| 2013/0333594 A1 | 12/2013 | Berthereau et al. | |

FOREIGN PATENT DOCUMENTS

| | | |
|---|---|---|
| CA | 2043699 | 12/1991 |
| EP | 0 074 655 A1 | 3/1983 |
| EP | 0132078 | 1/1985 |
| EP | 0 142 715 A2 | 5/1985 |
| EP | 0 146 398 A2 | 6/1985 |
| EP | 0 155 550 A1 | 9/1985 |
| EP | 0 178 688 A2 | 4/1986 |
| EP | 0 178 689 A2 | 4/1986 |
| EP | 0 186 128 A2 | 7/1986 |
| EP | 0 302 465 A2 | 2/1989 |
| EP | 0 417 493 A2 | 3/1991 |
| EP | 0 427 873 A1 | 5/1991 |
| EP | 0 539 342 A1 | 4/1993 |
| EP | 0 834 489 A1 | 4/1998 |
| EP | 1 086 936 A2 | 3/2001 |
| EP | 1 323 687 A2 | 7/2003 |
| EP | 1 908 737 A1 | 4/2008 |
| FR | 2662687 | 12/1991 |
| GB | 520247 | 4/1940 |
| GB | 1 360 197 | 7/1974 |
| GB | 1 360 198 | 7/1974 |
| GB | 1 360 199 | 7/1974 |
| GB | 1 360 200 | 7/1974 |
| GB | 2 200 129 A | 7/1988 |
| GB | 2 383 793 | 7/2003 |
| JP | 06-272116 A | 10/2006 |
| JP | 07-033546 A | 2/2007 |
| JP | 07-303011 A | 11/2007 |
| KR | 10-2004-0013846 A | 2/2004 |
| KR | 10-2010-0084917 A | 7/2010 |
| WO | WO 85/02393 A1 | 6/1985 |
| WO | WO 85/02394 A1 | 6/1985 |
| WO | WO 87/05007 A1 | 8/1987 |
| WO | WO 89/12032 A2 | 12/1989 |
| WO | WO 90/02713 A1 | 3/1990 |
| WO | WO 92/07801 A1 | 5/1992 |
| WO | WO 92/09536 A1 | 6/1992 |
| WO | WO 93/15028 A1 | 8/1993 |
| WO | WO 94/15883 A1 | 7/1994 |
| WO | WO 95/32926 A1 | 12/1995 |
| WO | WO 96/05147 A1 | 2/1996 |
| WO | 97/16386 A † | 5/1997 |
| WO | WO 98/32606 A1 | 7/1998 |
| WO | WO 98/51981 A1 | 11/1998 |
| WO | WO 02/16263 A1 | 2/2002 |
| WO | WO 03/031368 A2 | 4/2003 |
| WO | WO 03/050054 A1 | 6/2003 |
| WO | WO 03/059835 A1 | 7/2003 |
| WO | 2006/048610 A † | 5/2006 |
| WO | WO 2007/005836 A2 | 1/2007 |

OTHER PUBLICATIONS

Wallenburger, et al. "Inviscid melt spinning: As-spun crystalline alumina fibers", J. Mater. Res., vol. 5, No. 11, Nov. 1990.
Shyu, Jiin-Jyh and Wu, Jenn-Ming, Effect of $TiO_2$ addition on the nucleation of apatite in an $MgO$—$CaO$—$SiO$—$P_2O_5$ glass, Journal of Materials Science Letters, vol. 10, 1991.
International Search Report for PCT/US2014/072027, mailed on Mar. 31, 2015.
International Written Opinion for PCT/ US2014/072027, mailed on Mar. 31, 2015.
U.S. Appl. No. 14/581,039 to Zhao, et al., filed Dec. 23, 2014.
U.S. Appl. No. 14/580,268 to Zhao, et al., filed Dec. 23, 2014.
Third party observations filed on corresponding PCT application WO2016/010580.†

* cited by examiner
† cited by third party

INORGANIC FIBER WITH IMPROVED SHRINKAGE AND STRENGTH

This application claims the benefit of the filing date under 35 U.S.C. §119(e) of U.S. Provisional Application Patent Ser. No. 62/025,142 filed on Jul. 16, 2014, which is incorporated herein by reference.

TECHNICAL FIELD

A high temperature resistant inorganic fiber that is useful as a thermal, electrical, or acoustical insulating material, and which has a use temperature of 1260° C. and greater is provided. The high temperature resistant inorganic fiber is easily manufacturable, exhibits low shrinkage after exposure to the use temperature, retains good mechanical strength after continued exposure to the use temperature, and exhibits low biopersistence in physiological fluids.

BACKGROUND

The insulation material industry has determined that it is desirable to utilize fibers in thermal, electrical and acoustical insulating applications, which are not durable in physiological fluids, that is, fiber compositions which exhibit a low biopersistence in physiological fluids.

While candidate materials have been proposed, the use temperature limit of these materials have not been high enough to accommodate many of the applications to which high temperature resistant fibers are applied. For example, such low biopersistence fibers exhibit high shrinkage at use temperatures and/or reduced mechanical strength when exposed to use temperatures ranging from 1000° C. to 1400° C. as compared to the performance of refractory ceramic fibers.

The high temperature resistant, low biopersistence fibers should exhibit minimal shrinkage at expected exposure temperatures, and after prolonged or continuous exposure to the expected use temperatures, in order to provide effective thermal protection to the article being insulated.

In addition to temperature resistance as expressed by shrinkage characteristics that are important in fibers that are used in insulation, it is also required that the low biopersistence fibers have mechanical strength characteristics during and following exposure to the expected use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. In general, inorganic fibers that exhibit both high temperature resistance and low biopersistence in physiological fluids also exhibit a high degree of after service friability. This results in a brittle fiber lacking the strength or mechanical integrity after exposure to the service temperature to be able to provide the necessary structure to accomplish its insulating purpose. Other measures of mechanical integrity of fibers include compressive strength and compression recovery.

It is desirable to produce an improved inorganic fiber composition that is readily manufacturable from a fiberizable melt of desired ingredients, which exhibits low biopersistence in physiological fluids, low shrinkage during and after exposure to use temperatures of 1260° C. and greater, such as 1400° C. and greater, and, which exhibits low brittleness after exposure to the expected use temperatures, and which maintains mechanical integrity after exposure to use temperatures of 1260° C. and greater, such as 1400° C. and greater.

Provided is a high temperature resistant alkaline-earth silicate fiber exhibiting improved thermal stability when the inorganic fiber is exposed to elevated temperatures of 1000° C. to 1500° C. It has been found that the inclusion of suitable amount of lithium oxide to an alkaline-earth silicate inorganic fiber reduces fiber shrinkage and enhances mechanical strength beyond that of alkaline earth silicate fibers without the presence of the lithium oxide addition. The fiber exhibits low biopersistence in physiological solutions, reduced linear shrinkage, and improved mechanical strength after exposure to expected use temperatures.

According to certain embodiments, the inorganic fiber comprises the fiberization product of silica, magnesia, and up to about 1 weight percent lithium oxide.

According to certain embodiments, the inorganic fiber comprises the fiberization product of silica, magnesia, calcia, and up to about 1 weight percent lithium oxide.

According to certain embodiments, the inorganic fiber comprises the fiberization product of silica, calcia, and up to about 1 weight percent lithium oxide.

According to certain embodiments, the inorganic fiber comprises the fiberization product of silica, magnesia, lithium oxide and a viscosity modifier. Lithium oxide may be included in an amount up to about 1 weight percent.

According to certain embodiments, the inorganic fiber comprises the fiberization product of silica, magnesia, calcia, lithium oxide, and a viscosity modifier. Lithium oxide may be included in an amount up to about 1 weight percent.

According to certain embodiments, the inorganic fiber comprises the fiberization product of silica, calcia, lithium oxide, and a viscosity modifier. Lithium oxide may be included in an amount up to about 1 weight percent.

According to certain embodiments, the inorganic fiber comprises the fiberization product of silica, magnesia, lithium oxide, and alumina as a viscosity modifier. Lithium oxide may be included in an amount up to about 1 weight percent.

According to certain embodiments, the inorganic fiber comprises the fiberization product of silica, magnesia, calcia, lithium oxide, and alumina as a viscosity modifier. Lithium oxide may be included in an amount up to about 1 weight percent.

According to certain embodiments, the inorganic fiber comprises the fiberization product of silica, calcia, lithium oxide, and alumina as a viscosity modifier. Lithium oxide may be included in an amount up to about 1 weight percent.

According to certain embodiments, the inorganic fiber comprises the fiberization product of silica, magnesia, lithium oxide, and boria as a viscosity modifier. Lithium oxide may be included in an amount up to about 1 weight percent.

According to certain embodiments, the inorganic fiber comprises the fiberization product of silica, magnesia, calcia, lithium oxide, and boria as a viscosity modifier. Lithium oxide may be included in an amount up to about 1 weight percent.

According to certain embodiments, the inorganic fiber comprises the fiberization product of silica, calcia, lithium oxide, and boria as a viscosity modifier. Lithium oxide may be included in an amount up to about 1 weight percent.

According to certain embodiments, the inorganic fiber comprises the fiberization product of silica, magnesia, lithium oxide, and a mixture of alumina and boria as a viscosity modifier. Lithium oxide may be included in an amount up to about 1 weight percent.

According to certain embodiments, the inorganic fiber comprises the fiberization product of silica, magnesia, calcia, lithium oxide, and a mixture of alumina and boria as a viscosity modifier. Lithium oxide may be included in an amount up to about 1 weight percent.

According to certain embodiments, the inorganic fiber comprises the fiberization product of silica, calcia, lithium oxide, and mixture of alumina and boria as a viscosity modifier. Lithium oxide may be included in an amount up to about 1 weight percent.

According to certain embodiments, the inorganic fiber comprises the fiberization product of silica, magnesia, zirconia, lithium oxide, and a viscosity modifier. Lithium oxide may be included in an amount up to about 1 weight percent.

According to certain embodiments, the inorganic fiber comprises the fiberization product of silica, magnesia, zirconia, lithium oxide, and alumina as a viscosity modifier. Lithium oxide may be included in an amount up to about 1 weight percent.

According to certain embodiments, the inorganic fiber comprises the fiberization product of silica, magnesia, zirconia, lithium oxide, and boria as a viscosity modifier. Lithium oxide may be included in an amount up to about 1 weight percent.

According to certain embodiments, the inorganic fiber comprises the fiberization product of silica, magnesia, zirconia, lithium oxide, and a mixture of alumina and boria as a viscosity modifier. Lithium oxide may be included in an amount up to about 1 weight percent.

According to certain illustrative embodiments, the inorganic fiber comprises the fiberization product of about 65 to about 86 weight percent silica, about 14 to about 35 weight percent magnesia, and lithium oxide.

According to certain illustrative embodiments, the inorganic fiber comprises the fiberization product of about 65 to about 86 weight percent silica, about 14 to about 35 weight percent magnesia, and lithium oxide. Lithium oxide may be included in an amount up to about 1 weight percent.

According to certain illustrative embodiments, the inorganic fiber comprises the fiberization product of about 65 to about 86 weight percent silica, about 14 to about 35 weight percent magnesia, and greater than 0 to about 0.45 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.35 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.3 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.25 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.2 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.175 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.15 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.1 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.075 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.05 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.01 weight percent lithium oxide.

According to certain illustrative embodiments, the inorganic fiber comprises the fiberization product of about 65 to about 86 weight percent silica, about 14 to about 35 weight percent magnesia, and greater than 0 to about 0.005 weight percent lithium oxide.

According to certain illustrative embodiments, the inorganic fiber comprises the fiberization product of about 65 to about 86 weight percent silica, about 14 to about 35 weight percent magnesia, greater than 0 to about 0.45 weight percent lithium oxide, and a viscosity modifier. The viscosity modifier can be selected from alumina, boria, and mixtures of alumina and boria. When a viscosity modifier it present is may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.35 weight percent lithium oxide, and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.3 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.25 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.2 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.175 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.15 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.1 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.075 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.05 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.01 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.005 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.45 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.35 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.3 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, a greater than 0 to about 0.25 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.2 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.175 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.15 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.1 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.075 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.05 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.01 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.005 weight percent lithium oxide and from 0 to about 11 weight percent zirconia.

According to certain illustrative embodiments, the inorganic fiber comprises the fiberization product of about 65 to about 86 weight percent silica, about 14 to about 35 weight percent magnesia, greater than 0 to about 0.45 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.35 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.3 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.25 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.2 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.175 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.15 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.1 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.075 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.05 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.01 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 65 to about 86 weight percent silica, about 14 to about 35 weight percent magnesia, greater than 0 to about 0.005 weight percent lithium oxide, from 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, and up to about 1 weight percent lithium oxide. According to certain illustrative embodiments, the inorganic fiber comprises the fiberization product of about 70 to about 80 weight percent silica, about 20 to about 30 weight percent magnesia, and greater than 0 to about 0.45 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.35 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.3 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.25 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.2 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.175 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.15 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.1 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.075 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.01 weight percent lithium oxide.

According to certain illustrative embodiments, the inorganic fiber comprises the fiberization product of about 70 to about 80 weight percent silica, about 20 to about 30 weight percent magnesia, and greater than 0 to about 0.005 weight percent lithium oxide.

According to certain illustrative embodiments, the inorganic fiber comprises the fiberization product of about 70 to about 80 weight percent silica, about 20 to about 30 weight percent magnesia, greater than 0 to about 0.45 weight percent lithium oxide and a viscosity modifier. The viscosity modifier can be selected from alumina, boria, and mixtures of alumina and boria. When a viscosity modifier is present is may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.35 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.3 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.25 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.2 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.175 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.15 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.1 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, and greater than 0 to about 0.075 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.01 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.005 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.45 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.35 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.3 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.25 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.2 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.175 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.15 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.1 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.075 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.01 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 70 to about 80 weight percent silica, about 20 to about 30 weight percent magnesia, greater than 0 to about 0.005 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, and up to about 1 weight percent lithium oxide. According to certain illustrative embodiments, the inorganic fiber comprises the fiberization product of about 75 to about 80 weight percent silica, about 20 to about 25 weight percent magnesia, and greater than 0 to about 0.45 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.35 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.3 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.25 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.2 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.15 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.1 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.075 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.05 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.01 weight percent lithium oxide.

According to certain illustrative embodiments, the inorganic fiber comprises the fiberization product of about 75 to about 80 weight percent silica, about 20 to about 25 weight percent magnesia, and greater than 0 to about 0.005 weight percent lithium oxide.

According to certain illustrative embodiments, the inorganic fiber comprises the fiberization product of about 75 to about 80 weight percent silica, about 20 to about 25 weight percent magnesia, greater than 0 to about 0.45 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.35 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.3 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.25 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.2 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.15 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.1 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.075 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.05 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.01 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.005 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.45 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.35 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.3 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.25 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.2 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.15 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.1 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.075 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.05 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.01 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 75 to about 80 weight percent silica, about 20 to about 25 weight percent magnesia, greater than 0 to about 0.005 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, and up to about 1 weight percent lithium oxide. According to certain illustrative embodiments, the inorganic fiber comprises the fiberization product of about 76 to about 80 weight percent silica, about 20 to about 24 weight percent magnesia, and greater than 0 to about 0.45 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.35 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.3 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.25 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.2 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.15 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.1 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.075 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.05 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.01 weight percent lithium oxide.

According to certain illustrative embodiments, the inorganic fiber comprises the fiberization product of about 76 to about 80 weight percent silica, about 20 to about 24 weight percent magnesia, and greater than 0 to about 0.005 weight percent lithium oxide.

According to certain illustrative embodiments, the inorganic fiber comprises the fiberization product of about 76 to about 80 weight percent silica, about 20 to about 24 weight percent magnesia, greater than 0 to about 0.45 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.35 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.3 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.25 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.2 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.15 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.1 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.075 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.05 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.01 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.005 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.45 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.35 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.3 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.25 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.2 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.15 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.1 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.075 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.05 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.01 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 76 to about 80 weight percent silica, about 20 to about 24 weight percent magnesia, greater than 0 to about 0.005 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, and up to about 1 weight percent lithium oxide. According to certain illustrative embodiments, the inorganic fiber comprises the fiberization product of about 77 to about 80 weight percent silica, about 20 to about 23 weight percent magnesia, and greater than 0 to about 0.45 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.35 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.3 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.25 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.2 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.15 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.1 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.075 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.05 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.01 weight percent lithium oxide.

According to certain illustrative embodiments, the inorganic fiber comprises the fiberization product of about 77 to about 80 weight percent silica, about 20 to about 23 weight percent magnesia, and greater than 0 to about 0.005 weight percent lithium oxide.

According to certain illustrative embodiments, the inorganic fiber comprises the fiberization product of about 77 to about 80 weight percent silica, about 20 to about 23 weight percent magnesia, greater than 0 to about 0.45 weight percent lithium oxide, and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.35 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.3 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.25 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.2 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.15 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.1 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.075 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.05 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.01 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.005 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.45 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.35 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.3 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.25 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.2 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.15 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.1 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.075 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.05 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.01 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 77 to about 80 weight percent silica, about 20 to about 23 weight percent magnesia, greater than 0 to about 0.005 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, and up to about 1 weight percent lithium oxide. According to certain illustrative embodiments, the inorganic fiber comprises the fiberization product of about 78 to about 81 weight percent silica, about 19 to about 22 weight percent magnesia, greater than 0 to about 0.45 weight percent lithium oxide. According to certain illustrative embodiments, the inorganic fiber comprises the fiberization product of about 79 to about 81 weight percent silica, about 19 to about 21 weight percent magnesia, greater than 0 to about 0.45 weight percent lithium oxide. According to certain illustrative embodiments, the inorganic fiber comprises the fiberization product of about 78 to about 80 weight percent silica, about 20 to about 22 weight percent magnesia, greater than 0 to about 0.45 weight percent lithium oxide.

According to certain illustrative embodiments, the inorganic fiber comprises the fiberization product of about 78 to about 81 weight percent silica, about 19 to about 22 weight percent magnesia, greater than 0 to about 0.35 weight percent lithium oxide. According to certain illustrative embodiments, the inorganic fiber comprises the fiberization product of about 79 to about 81 weight percent silica, about 19 to about 21 weight percent magnesia, greater than 0 to about 0.35 weight percent lithium oxide. According to certain illustrative embodiments, the inorganic fiber comprises the fiberization product of about 78 to about 80 weight percent silica, about 20 to about 22 weight percent magnesia, and greater than 0 to about 0.35 weight percent lithium oxide.

According to certain illustrative embodiments, the inorganic fiber comprises the fiberization product of about 78 to about 81 weight percent silica, about 19 to about 22 weight percent magnesia, greater than 0 to about 0.3 weight percent lithium oxide. According to certain illustrative embodiments, the inorganic fiber comprises the fiberization product of about 79 to about 81 weight percent silica, about 19 to about 21 weight percent magnesia, greater than 0 to about 0.3 weight percent lithium oxide. According to certain illustrative embodiments, the inorganic fiber comprises the fiberization product of about 78 to about 80 weight percent silica, about 20 to about 22 weight percent magnesia, and greater than 0 to about 0.3 weight percent lithium oxide.

According to certain illustrative embodiments, the inorganic fiber comprises the fiberization product of about 78 to about 81 weight percent silica, about 19 to about 22 weight percent magnesia, greater than 0 to about 0.25 weight percent lithium oxide. According to certain illustrative embodiments, the inorganic fiber comprises the fiberization product of about 79 to about 81 weight percent silica, about 19 to about 21 weight percent magnesia, greater than 0 to about 0.25 weight percent lithium oxide. According to certain illustrative embodiments, the inorganic fiber comprises the fiberization product of about 78 to about 80 weight percent silica, about 20 to about 22 weight percent magnesia, and greater than 0 to about 0.25 weight percent lithium oxide.

According to certain illustrative embodiments, the inorganic fiber comprises the fiberization product of about 78 to about 81 weight percent silica, about 19 to about 22 weight percent magnesia, greater than 0 to about 0.2 weight percent lithium oxide. According to certain illustrative embodiments, the inorganic fiber comprises the fiberization product of about 79 to about 81 weight percent silica, about 19 to about 21 weight percent magnesia, greater than 0 to about 0.2 weight percent lithium oxide. According to certain illustrative embodiments, the inorganic fiber comprises the fiberization product of about 78 to about 80 weight percent silica, about 20 to about 22 weight percent magnesia, and greater than 0 to about 0.2 weight percent lithium oxide.

According to certain illustrative embodiments, the inorganic fiber comprises the fiberization product of about 78 to about 81 weight percent silica, about 19 to about 22 weight percent magnesia, greater than 0 to about 0.15 weight percent lithium oxide. According to certain illustrative embodiments, the inorganic fiber comprises the fiberization product of about 79 to about 81 weight percent silica, about 19 to about 21 weight percent magnesia, greater than 0 to about 0.15 weight percent lithium oxide. According to certain illustrative embodiments, the inorganic fiber comprises the fiberization product of about 78 to about 80 weight percent silica, about 20 to about 22 weight percent magnesia, and greater than 0 to about 0.15 weight percent lithium oxide.

According to certain illustrative embodiments, the inorganic fiber comprises the fiberization product of about 78 to about 81 weight percent silica, about 19 to about 22 weight percent magnesia, greater than 0 to about 0.1 weight percent lithium oxide. According to certain illustrative embodiments, the inorganic fiber comprises the fiberization product of about 79 to about 81 weight percent silica, about 19 to about 21 weight percent magnesia, greater than 0 to about 0.1 weight percent lithium oxide. According to certain illustrative embodiments, the inorganic fiber comprises the fiberization product of about 78 to about 80 weight percent silica, about 20 to about 22 weight percent magnesia, and greater than 0 to about 0.1 weight percent lithium oxide.

According to certain illustrative embodiments, the inorganic fiber comprises the fiberization product of about 78 to about 81 weight percent silica, about 19 to about 22 weight percent magnesia, greater than 0 to about 0.075 weight percent lithium oxide. According to certain illustrative embodiments, the inorganic fiber comprises the fiberization product of about 79 to about 81 weight percent silica, about 19 to about 21 weight percent magnesia, greater than 0 to about 0.075 weight percent lithium oxide. According to certain illustrative embodiments, the inorganic fiber comprises the fiberization product of about 78 to about 80 weight percent silica, about 20 to about 22 weight percent magnesia, and greater than 0 to about 0.075 weight percent lithium oxide.

According to certain illustrative embodiments, the inorganic fiber comprises the fiberization product of about 78 to about 81 weight percent silica, about 19 to about 22 weight percent magnesia, greater than 0 to about 0.05 weight percent lithium oxide. According to certain illustrative embodiments, the inorganic fiber comprises the fiberization product of about 79 to about 81 weight percent silica, about 19 to about 21 weight percent magnesia, greater than 0 to about 0.05 weight percent lithium oxide. According to certain illustrative embodiments, the inorganic fiber comprises the fiberization product of about 78 to about 80 weight percent silica, about 20 to about 22 weight percent magnesia, and greater than 0 to about 0.05 weight percent lithium oxide.

According to certain illustrative embodiments, the inorganic fiber comprises the fiberization product of about 78 to about 81 weight percent silica, about 19 to about 22 weight percent magnesia, greater than 0 to about 0.01 weight percent lithium oxide. According to certain illustrative embodiments, the inorganic fiber comprises the fiberization product of about 79 to about 81 weight percent silica, about 19 to about 21 weight percent magnesia, greater than 0 to about 0.01 weight percent lithium oxide. According to certain illustrative embodiments, the inorganic fiber comprises the fiberization product of about 78 to about 80 weight percent silica, about 20 to about 22 weight percent magnesia, greater than 0 to about 0.01 weight percent lithium oxide.

According to certain illustrative embodiments, the inorganic fiber comprises the fiberization product of about 78 to about 81 weight percent silica, about 19 to about 22 weight percent magnesia, greater than 0 to about 0.005 weight percent lithium oxide. According to certain illustrative embodiments, the inorganic fiber comprises the fiberization product of about 79 to about 81 weight percent silica, about 19 to about 21 weight percent magnesia, greater than 0 to about 0.005 weight percent lithium oxide. According to certain illustrative embodiments, the inorganic fiber comprises the fiberization product of about 78 to about 80 weight percent silica, about 20 to about 22 weight percent magnesia, greater than 0 to about 0.005 weight percent lithium oxide.

According to certain illustrative embodiments, the inorganic fiber comprises the fiberization product of about 78 to about 81 weight percent silica, about 19 to about 22 weight percent magnesia, greater than 0 to about 0.45 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.45 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.45 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.35 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.35 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.35 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.3 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.3 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.3 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.25 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.25 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.25 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.2 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.2 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.2 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.15 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.15 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.15 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.1 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.1 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.1 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.075 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.075 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.075 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.05 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.05 weight percent lithium oxide and a viscosity modifier. According to certain illustrative embodiments, the inorganic fiber comprises the fiberization product of about 78 to about 80 weight percent silica, about 20 to about 22 weight percent magnesia, and greater than 0 to about 0.05 weight percent lithium oxide and a viscosity modifier. The viscosity modifier can be selected from alumina, boria, and mixtures of alumina and boria. When a viscosity modifier is present is may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.01 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.01 weight percent lithium oxide and a viscosity modifier. According to certain illustrative embodiments, the inorganic fiber comprises the fiberization product of about 78 to about 80 weight percent silica, about 20 to about 22 weight percent magnesia, greater than 0 to about 0.01 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.005 weight percent lithium oxide and a viscosity modifier. According to certain illustrative embodiments, the inorganic fiber comprises the fiberization product of about 79 to about 81 weight percent silica, about 19 to about 21 weight percent magnesia, greater than 0 to about 0.005 weight percent lithium oxide and a viscosity modifier. According to certain illustrative embodiments, the inorganic fiber comprises the fiberization product of about 78 to about 80 weight percent silica, about 20 to about 22 weight percent magnesia, greater than 0 to about 0.005 weight percent lithium oxide and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.45 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.45 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.45 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.35 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.35 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.35 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.43 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.3 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.3 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.25 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.25 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.25 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.2 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.2 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.2 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.15 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.15 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.15 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.1 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.1 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.1 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.075 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.075 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.075 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.05 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.05 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, and greater than 0 to about 0.05 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.01 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.01 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, greater than 0 to about 0.01 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to certain illustrative embodiments, the inorganic fiber comprises the fiberization product of about 78 to about 81 weight percent silica, about 19 to about 22 weight percent magnesia, greater than 0 to about 0.005 weight percent lithium oxide, greater than 0 to about 11 weight percent zirconia, and a viscosity modifier. According to certain illustrative embodiments, the inorganic fiber comprises the fiberization product of about 79 to about 81 weight percent silica, about 19 to about 21 weight percent magnesia, greater than 0 to about 0.005 weight percent lithium oxide, greater than 0 to about 11 weight percent zirconia, and a viscosity modifier. According to certain illustrative embodiments, the inorganic fiber comprises the fiberization product of about 78 to about 80 weight percent silica, about 20 to about 22 weight percent magnesia, greater than 0 to about 0.005 weight percent lithium oxide, greater than 0 to about 11 weight percent zirconia and a viscosity modifier. The viscosity modifier can be selected from alumina, boria, and mixtures of alumina and boria. When a viscosity modifier is present it may include greater than 0 to about 2 weight percent alumina, or greater than 0 to about 1 weight percent boria, or a mixture of greater than 0 to about 2 weight percent alumina and greater than 0 to about 1 weight percent boria.

According to further illustrative embodiments, the inorganic fiber may comprise the fiberization product of silica in any of the range disclosed herein, magnesia in any of the ranges disclosed herein, optionally calcia in any of the ranges disclosed herein, optionally zirconia in any of the range disclosed herein, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 65 to about 86 weight percent silica, from about 14 to about 35 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 70 to about 80 weight percent silica, from about 20 to about 30 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 75 to about 80 weight percent silica, from about 20 to about 25 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 76 to about 80 weight percent silica, from about 20 to about 24 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 77 to about 80 weight percent silica, from about 20 to about 23 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 78 to about 80 weight percent silica, from about 20 to about 22 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 78 to about 81 weight percent silica, from about 19 to about 22 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to further illustrative embodiments, the inorganic fiber may comprise the fiberization product from about 79 to about 81 weight percent silica, from about 19 to about 21 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to any of the above illustrative embodiments, the inorganic fiber contains 1 weight percent or less calcia. According to any of the above illustrative embodiments, the inorganic fiber contains 0.5 weight percent or less calcia. According to any of the above illustrative embodiments, the inorganic fiber contains 0.3 weight percent or less calcia.

According to any of the above embodiments, provided is a high temperature resistant inorganic fiber which exhibits a linear shrinkage of 5% or less when exposed a use temperature of 1260° C. and greater for 24 hours, and which maintains mechanical integrity after exposure to the use temperature, and which exhibits low biopersistence in physiological fluids.

According to any of the above embodiments, provided is a high temperature resistant inorganic fiber which exhibits a linear shrinkage of 5% or less when exposed a use temperature of 1260° C. and greater for 168 hours, and which maintains mechanical integrity after exposure to the use temperature, and which exhibits low biopersistence in physiological fluids.

According to any of the above embodiments, the high temperature resistant inorganic fiber exhibits a linear shrinkage of 4% or less when exposed a use temperature of 1260° C. and greater for 24 hours, maintains mechanical integrity after exposure to the use temperature, and which exhibits low biopersistence in physiological fluids.

According to any of the above embodiments, the high temperature resistant inorganic fiber exhibits a linear shrinkage of 4% or less when exposed a use temperature of 1260° C. and greater for 168 hours, maintains mechanical integrity after exposure to the use temperature, and which exhibits low biopersistence in physiological fluids.

According to any of the above embodiments, provided is a high temperature resistant inorganic fiber which exhibits a linear shrinkage of 5% or less when exposed a use temperature of 1400° C. or greater for 24 horns, and which maintains mechanical integrity after exposure to the use temperature, and which exhibits low biopersistence in physiological fluids.

According to any of the above embodiments, provided is a high temperature resistant inorganic fiber which exhibits a linear shrinkage of 5% or less when exposed a use temperature of 1400° C. or greater for 168, and which maintains mechanical integrity after exposure to the use temperature, and which exhibits low biopersistence in physiological fluids.

According to any of the above embodiments, the high temperature resistant inorganic fiber exhibits a linear shrinkage of 4% or less when exposed a use temperature of 1400° C. or greater for 24 hours, and which maintains mechanical integrity after exposure to the use temperature, and exhibit low biopersistence in physiological fluids.

According to any of the above embodiments, the high temperature resistant inorganic fiber exhibits a linear shrinkage of 4% or less when exposed a use temperature of 1400° C. or greater for 168 hours, and which maintains mechanical integrity after exposure to the use temperature, and exhibit low biopersistence in physiological fluids.

According to any of the above embodiments, provided is a method for preparing a high temperature resistant inorganic fiber having a use temperature of 1260° C. or greater, which maintains mechanical integrity after exposure to the use temperature, and which exhibits low biopersistence in physiological fluids.

According to any of the above embodiments, provided is a method for preparing a high temperature resistant inorganic fiber having a use temperature of 1400° C. or greater, which maintains mechanical integrity after exposure to the use temperature, and which exhibits low biopersistence in physiological fluids.

The method for preparing the fiber comprises forming a melt with ingredients comprising either (i) silica and magnesia, or (ii) silica and calcia, or (iii) silica, magnesia and calcia, lithium oxide, optionally greater than 0 to 11 weight percent zirconia, and optionally a viscosity modifier; and producing fibers from the melt.

The method for preparing the fiber comprises forming a melt with ingredients comprising either (i) silica and magnesia, or (ii) silica and calcia, or (iii) silica, magnesia and calcia, and up to about 1 weight percent lithium oxide, optionally greater than 0 to 11 weight percent zirconia, and optionally a viscosity modifier; and producing fibers from the melt. The method for preparing the fiber comprises forming a melt with ingredients comprising either (i) silica and magnesia, or (ii) silica and calcia, or (iii) silica, magnesia and calcia, and greater than 0 to about 0.45 weight percent lithium oxide, optionally greater than 0 to 11 weight percent zirconia, and optionally a viscosity modifier; and producing fibers from the melt.

According to certain illustrative embodiments, the method for preparing the fiber comprises forming a melt with ingredients comprising from about 65 to about 86 weight percent silica, from about 14 to about 35 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method for preparing the fiber comprises forming a melt with ingredients comprising from about 70 to about 80 weight percent silica, from about 20 to about 30 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method for preparing the fiber comprises forming a melt with ingredients comprising from about 75 to about 80 weight percent silica, from about 20 to about 25 weight percent magnesia, and up to about 1 weight percent lithium oxide, optionally greater than 0 to 11 weight percent zirconia, and optionally a viscosity modifier; and producing fibers from the melt. According to certain illustrative embodiments, the method for preparing the fiber comprises forming a melt with ingredients comprising from about 75 to about 80 weight percent silica, from about 20 to about 25 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method for preparing the fiber comprises forming a melt with ingredients comprising from about 76 to about 80 weight percent silica, from about 20 to about 24 weight percent magnesia, and up to about 1 weight percent lithium oxide, optionally greater than 0 to 11 weight percent zirconia, and optionally a viscosity modifier; and producing fibers from the melt. According to certain illustrative embodiments, the method for preparing the fiber comprises forming a melt with ingredients comprising from about 76 to about 80 weight percent silica, from about 20 to about 24 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method for preparing the fiber comprises forming a melt with ingredients comprising from about 77 to about 80 weight percent silica, from about 20 to about 23 weight percent magnesia, and up to about 1 weight percent lithium oxide, optionally greater than 0 to 11 weight percent zirconia, and optionally a viscosity modifier; and producing fibers from the melt. According to certain illustrative embodiments, the method for preparing the fiber comprises forming a melt with ingredients comprising from about 77 to about 80 weight percent silica, from about 20 to about 23 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method for preparing the fiber comprises forming a melt with ingredients comprising from about 78 to about 80 weight percent silica, from about 20 to about 22 weight percent magnesia, and up to about 1 weight percent lithium oxide, optionally greater than 0 to 11 weight percent zirconia, and optionally a viscosity modifier; and producing fibers from the melt. According to certain illustrative embodiments, the method for preparing the fiber comprises forming a melt with ingredients comprising from about 78 to about 80 weight percent silica, from about 20 to about 22 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method for preparing the fiber comprises forming a melt with ingredients comprising silica in any of the range disclosed herein, magnesia in any of the ranges disclosed herein, optionally calcia in any of the ranges disclosed herein, optionally zirconia in any of the range disclosed herein, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 65 to about 86 weight percent silica, from about 14 to about 35 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 70 to about 80 weight percent silica, from about 20 to about 30 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 75 to about 80 weight percent silica, from about 20 to about 25 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 76 to about 80 weight percent silica, from about 20 to about 24 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 77 to about 80 weight percent silica, from about 20 to about 23 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 78 to about 80 weight percent silica, from about 20 to about 22 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 78 to about 81 weight percent silica, from about 19 to about 22 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method for preparing the fiber comprises forming a melt with ingredients comprising from about 79 to about 81 weight percent silica, from about 19 to about 21 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

Without limitation, the viscosity modifier that is added to the melt of ingredients to prepare the inorganic fiber may be selected from alumina, boria, and mixtures of alumina and boria. The viscosity modifier is included in the melt of ingredients in an amount effective render the melt fiberizable.

Also provided is a method of thermally insulating an article with fibrous insulation prepared from a plurality of the presently disclosed high temperature resistant low biopersistent inorganic fibers of any of the above disclosed illustrative embodiments. The method includes disposing on, in, near or around the article to be thermally insulated, a thermal insulation material comprising a plurality of the inorganic fibers comprising the fiberization product of either (i) silica and magnesia, or (ii) silica and calcia, or (iii) silica, magnesia and calcium, and greater than 0 to about 1 weight percent lithium oxide, optionally greater than 0 to 11 weight percent zirconia, and optionally a viscosity modifier, wherein the fiberization product comprises any one of the above-disclosed fiberization products.

According to certain illustrative embodiments, the method of thermally insulating an article with fibrous insulation comprising a plurality fibers comprising the fiberization product of from about 65 to about 86 weight percent silica, from about 14 to about 36 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method of thermally insulating an article with fibrous insulation comprising a plurality fibers comprising the fiberization product of from about 70 to about 80 weight percent silica, from about 20 to about 30 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method of thermally insulating an article with fibrous insulation comprising a plurality fibers comprising the fiberization product of from about 75 to about 80 weight percent silica, from about 20 to about 25 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method of thermally insulating an article with fibrous insulation comprising a plurality fibers comprising the fiberization product of from about 76 to about 80 weight percent silica, from about 20 to about 24 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method of thermally insulating an article with fibrous insulation comprising a plurality fibers comprising the fiberization product of from about 77 to about 80 weight percent silica, from about 20 to about 23 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method of thermally insulating an article with fibrous insulation comprising a plurality fibers comprising the fiberization product of from about 78 to about 80 weight percent silica, from about 20 to about 22 weight percent magnesia, and greater than 0 to about 0.45 weight percent lithium oxide, optionally greater than 0 to 11 weight percent zirconia, and optionally a viscosity modifier; and producing fibers from the melt.

According to certain illustrative embodiments, the method of thermally insulating an article with fibrous insulation comprising a plurality fibers comprising the fiberization product of silica in any of the range disclosed herein, magnesia in any of the ranges disclosed herein, optionally calcia in any of the ranges disclosed herein, optionally zirconia in any of the range disclosed herein, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 65 to about 86 weight percent silica, from about 14 to about 35 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 70 to about 80 weight percent silica, from about 20 to about 30 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 75 to about 80 weight percent silica, from about 20 to about 25 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 76 to about 80 weight percent silica, from about 20 to about 24 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 77 to about 80 weight percent silica, from about 20 to about 23 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 78 to about 80 weight percent silica, from about 20 to about 22 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 78 to about 81 weight percent silica, from about 19 to about 22 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

According to certain illustrative embodiments, the method of thermally insulating an article with fibrous insulation comprising a plurality fibers comprising the fiberization product of from about 79 to about 81 weight percent silica, from about 19 to about 21 weight percent magnesia, optionally calcia in any of the ranges disclosed herein, optionally from greater than 0 to about 11 weight percent zirconia, optionally a viscosity modifier in any of the ranges disclosed herein, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

Also provided is an inorganic fiber containing article comprising at least one of bulk fiber, blankets, blocks, boards, caulking compositions, cement compositions, coatings, felts, mats, moldable compositions, modules, papers, pumpable compositions, putty compositions, sheets, tamping mixtures, vacuum cast shapes, vacuum cast forms, or woven textiles (for example, braids, cloths, fabrics, ropes, tapes, sleeving, wicking).

In order for a glass composition to be a viable candidate for producing a satisfactory high temperature resistant fiber product, the fiber to be produced must be manufacturable, sufficiently soluble (ie, having low biopersistence) in physiological fluids, and capable of surviving high temperatures with minimal shrinkage and minimal loss of mechanical integrity during exposure to the high service temperatures.

The present inorganic fiber exhibits low biopersistence in physiological fluids. By "low biopersistence" in physiological fluids, it is meant that the inorganic fiber at least partially dissolves in such fluids, such as simulated lung fluid, during in vitro tests.

Biopersistence may be tested by measuring the rate at which mass is lost from the fiber ($ng/cm^2$-hr) under conditions which simulate the temperature and chemical conditions found in the human lung. This test consists of exposing approximately 0.1 g of de-shotted fiber to 50 ml of simulated lung fluid (SLF) for 6 hours. The entire test system is maintained at 37° C., to simulate the temperature of the human body.

After the SLF has been exposed to the fiber, it is collected and analyzed for glass constituents using Inductively Coupled Plasma Spectroscopy. A "blank" SLF sample is also measured and used to correct for elements present in the SLF. Once this data has been obtained, it is possible to calculate the rate at which the fiber has lost mass over the time interval of the study. The fibers are significantly less biopersistent than normal refractory ceramic fiber in simulated lung fluid.

"Viscosity" refers to the ability of a glass melt to resist flow or shear stress. The viscosity-temperature relationship is critical in determining whether it is possible to fiberize a given glass composition. An optimum viscosity curve would have a low viscosity (5-50 poise) at the fiberization temperature and would gradually increase as the temperature decreased. If the melt is not sufficiently viscous (i.e. too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity is dependent upon melt chemistry, which is also affected by elements or compounds that act as viscosity modifiers. Viscosity modifiers permit fibers to be blown or spun from the fiber melt. It is desirable, however, that such viscosity modifiers, either by type or amount, do not adversely impact the solubility, shrink resistance, or mechanical strength of the blown or spun fiber.

One approach to testing whether a fiber of a defined composition can be readily manufactured at an acceptable quality level is to determine whether the viscosity curve of the experimental chemistry matches that of a known product which can be easily fiberized. Viscosity-temperature profiles may be measured on a viscometer, capable of operating at elevated temperatures. In addition, an adequate viscosity profile may be inferred by routine experimentation, examining the quality of fiber (index, diameter, length) produced. The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of the composition, as will the overall steepness of the viscosity vs. temperature curve. The present fiber melt composition possesses a viscosity profile of a readily manufacturable fiber.

Linear shrinkage of an inorganic fiber is a good measure of a fiber's dimensional stability at high temperatures or of its performance at a particular continuous service or use temperature. Fibers are tested for shrinkage by forming them into a mat and needle punching the mat together into a blanket of approximately 4-10 pounds per cubic foot density and a thickness of about 1 inch. Such pads are cut into 3 inch×5 inch pieces and platinum pins are inserted into the face of the material. The separation distance of these pins is then carefully measured and recorded. The pad is then placed into a furnace, ramped to temperature and held at the temperature for a fixed period of time. After heating, the pin separation is again measured to determine the linear shrinkage that pad has experienced.

In one such test, the length and width of the fiber pieces were carefully measured, and the pad was placed in a furnace and brought to a temperature of 1260 or 1400° C. for 24 or 168 hours. After cooling, the lateral dimensions were measured and the linear shrinkage was determined by comparing "before" and "after" measurements. If the fiber is available in blanket form, measurements may be made directly on the blanket without the need to form a pad.

Mechanical integrity is also an important property since the fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers. The ability of the fiber to maintain its integrity after exposure to the use temperature may also be measured mechanically by testing for compression strength and compression recovery. These tests measure, respectively, how easily the pad may be deformed and the amount of resiliency (or compression recovery) the pad exhibits after a compression of 50%. Visual and tactile observations indicate that the present inorganic fiber remains intact and maintains its form after exposure to a use temperature of at least 1260 or 1400° C.

According to certain embodiments, the low shrinkage, high temperature resistant inorganic fiber comprises the fiberization product of a melt containing magnesia and silica as the primary constituents. The low biopersistent inorganic fibers are made by standard glass and ceramic fiber manufacturing methods. Raw materials, such as silica, any suitable source of magnesia such as enstatite, forsterite, magnesia, magnesite, calcined magnesite, magnesium zirconate, periclase, steatite, or talc. Lithium may be included in the fiber melt as $LiCO_3$. If zirconia is included in the fiber melt, any suitable source of zirconia such as baddeleyite, magnesium zirconate, zircon or zirconia, are introduced into a suitable furnace where they are melted and blown using a fiberization nozzle, or spun, either in a batch or a continuous mode.

An inorganic fiber comprising the fiberization product of magnesia and silica is referred to as a "magnesium-silicate" fiber. An inorganic fiber comprising the fiberization product of calcia, magnesia and silica is referred to as a "calcia-magnesium-silicate" fiber. An inorganic fiber comprising the fiberization product of calcia and silica is referred to as a "calcium-silicate" fiber. The low shrinkage, high temperature resistant inorganic fiber also comprises and a lithium oxide-bearing raw material component as part of the fiber melt chemistry.

According to certain embodiments, the present inorganic fiber has an average diameter of greater than 2 microns. According to certain embodiments, the present inorganic fiber has an average diameter of greater than 2 microns to about 7.5 microns. According to certain embodiments, the present inorganic fiber has an average diameter of about 3.5 to about 7 microns.

According to any one of the illustrative fiberization products disclosed above, the inorganic fiber exhibits low shrinkage and good mechanical strength at temperatures from about 1100° C. to about 1500° C. and low biopersistence.

According to any one of the illustrative fiberization products disclosed above, the inorganic fiber present exhibits low shrinkage and good mechanical strength at temperatures from about 1260° C. to about 1500° C. and low biopersistence.

According to any one of the illustrative fiberization products disclosed above, the inorganic fiber exhibits low shrinkage and good mechanical strength at temperatures from about 1260° C. to about 1400° C. and low biopersistence.

According to any one of the illustrative fiberization products disclosed above, the inorganic fiber exhibits low shrinkage and good mechanical strength at temperatures from about 1400° C. to about 1500° C. and low biopersistence.

The magnesium-silicate fibers containing intended additions of lithium oxide exhibit a linear shrinkage after exposure to a service temperature of 1400° C. for 24 hours of 10 percent or less. In other embodiments, the magnesium-silicate fibers containing intended additions of lithium oxide exhibit a linear shrinkage after exposure to a service temperature of 1400° C. for 24 hours of 5 percent or less. In other embodiments, the magnesium-silicate fibers containing intended additions of lithium oxide a linear shrinkage after exposure to a service temperature of 1400° C. for 24 hours of 4 percent or less.

The inorganic fibers containing intended additions of lithium oxide are useful for thermal insulating applications at continuous service or operating temperatures of at least 1260° C. and greater. According to certain embodiments, the fibers containing lithium oxide are useful for thermal insulating applications at continuous service or operating temperatures of at least 1400° C. and it has been found that the magnesium-silicate fibers containing the lithium oxide additions do not melt until they are exposed to a temperature of 1500° C. or greater.

The inorganic fibers may be prepared by fiber blowing or fiber spinning techniques. A suitable fiber blowing technique includes the steps of mixing the starting raw materials containing magnesia, silica, lithium oxide, viscosity modifier, and optional zirconia together to form a material mixture of ingredients, introducing the material mixture of ingredients into a suitable vessel or container, melting the material mixture of ingredients for discharge through a suitable nozzle, and blowing a high pressure gas onto the discharged flow of molten material mixture of ingredients to form the fibers.

A suitable fiber spinning technique includes the steps of mixing the starting raw materials together to form a material mixture of ingredients, introducing the material mixture of ingredients into a suitable vessel or container, melting the material mixture of ingredients for discharge through a suitable nozzle onto spinning wheels. The molten stream then cascades over the wheels, coating the wheels and being thrown off through centripetal forces, thereby forming fibers.

In some embodiments, the fiber is produced from a melt of raw materials by subjecting the molten stream to a jet of high pressure/high velocity air or by pouring the melt onto rapidly spinning wheels and spinning fiber centrifugally. The lithium oxide is provided as an additive to the melt, and a suitable source of the lithium oxide raw material is simply added at the proper amount to the raw materials being melted.

The addition of lithium oxide as a component of the raw materials which are fiberized results in a decrease of linear shrinkage of the resulting fiber after exposure to the use temperature. The lithium oxide may also be provided as either a continuous or discontinuous coating on the outer surfaces of the inorganic fibers.

In addition to the lithium oxide-bearing compounds, the viscosity of the material melt of ingredients may optionally be controlled by the presence of viscosity modifiers, in an amount sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

The fiber may be manufactured with existing fiberization technology and formed into multiple thermal insulation product forms, including but not limited to bulk fibers, fiber-containing blankets, boards, papers, felts, mats, blocks, modules, coatings, cements, moldable compositions, pumpable compositions, putties, ropes, braids, wicking, textiles (such as cloths, tapes, sleeving, string, yarns, etc. . . . ), vacuum cast shapes and composites. The fiber may be used in combination with conventional materials utilized in the production of fiber-containing blankets, vacuum cast shapes and composites, as a substitute for conventional refractory ceramic fibers. The fiber may be used alone or in combination with other materials, such as binders and the like, in the production of fiber-containing paper and felt.

The fiber may be easily melted by standard glass furnacing methods, fiberized by standard RCF fiberization equipment, and is soluble in simulated body fluids.

A method of insulating an article using a thermal insulation containing the disclosed inorganic fibers is also provided. The method of insulating an article includes disposing on, in, near, or around the article to be insulated, a thermal insulation material that contains the inorganic fibers containing an intended lithium oxide addition.

The high temperature resistant inorganic fibers are readily manufacturable from a melt having a viscosity suitable for blowing or spinning fiber, are non-durable in physiological fluids, exhibit good mechanical strength up to the service temperature, exhibit excellent linear shrinkage up to 1400° C. and above and improved viscosity for fiberization.

EXAMPLES

The following examples are set forth to describe illustrative embodiments of the inorganic fibers containing lithium oxide addition in further detail and to illustrate the methods of preparing the inorganic fibers, preparing thermal insulating articles containing the fibers and using the fibers as thermal insulation. However, the examples should not be construed as limiting the fiber, the fiber containing articles, or the processes of making or using the fibers as thermal insulation in any manner.

Linear Shrinkage

A shrinkage pad was prepared by needling a fiber mat using a bank of felting needles. A 3 inch×5 inch test piece was cut from the pad and was used in the shrinkage testing. The length and width of the test pad was carefully measured. The test pad was then placed into a furnace and brought to a temperature of 1400° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

A second shrinkage pad was prepared in a manner similar to that disclosed for the first shrinkage pad. However, the second shrinkage pad was placed in a furnace and brought to a temperature of 1260° C. for 24 hours. After heating for 24 hours, the test pad was removed from the test furnace and cooled. After cooling, the length and width of the test pad were measured again. The linear shrinkage of the test pad was determined by comparing the "before" and "after" dimensional measurements.

Compression Recovery

The ability of the inorganic fibers to retain mechanical strength after exposure to a use temperature was evaluated by a compression recovery test. Compression recovery is a measure of the mechanical performance of an inorganic fiber in response to the exposure of the fiber to a desired use temperature for a given period of time. Compression recovery is measured by firing test pads manufactured from the inorganic fiber material to the test temperature for the selected period of time. The fired test pads are thereafter compressed to half of their original thickness and allowed to rebound. The amount of rebound is measured as percent recovery of the compressed thickness of the pad. Compression recovery was measured after exposure to use temperatures of 1260° C. for 24 hours and 168 hours, and 1400° C. for 24 hours and 168 hours. According to certain illustrative embodiments, the test pads manufactured from the inorganic fibers exhibit a compression recovery of at least 10 percent.

Fiber Dissolution

The inorganic fiber is non-durable or non-biopersistent in physiological fluids. By "non-durable" or "non-biopersistent" in physiological fluids it is meant that the inorganic fiber at least partially dissolves or decomposes in such fluids, such as simulated lung fluid, during in vitro tests described herein.

The biopersistence test measures the rate at which mass is lost from the fiber (ng/cm$^2$-hr) under conditions which simulate the temperature and chemical conditions found in the human lung. In particular, the fibers exhibit low biopersistence in Simulated Lung Fluid at a pH of 7.4.

To measure the dissolution rate of fibers in simulated lung fluid, approximately 0.1 g of fiber is placed into a 50 ml centrifuge tube containing simulated lung fluid which has been warmed to 37° C. This is then placed into a shaking incubator for 6 hours and agitated at 100 cycles per minute. At the conclusion of the test, the tube is centrifuged and the solution is poured into a 60 ml syringe. The solution is then forced through a 0.45 μm filter to remove any particulate and tested for glass constituents using Inductively Coupled Plasma Spectroscopy analysis. This test may be conducted using either a near-neutral pH solution or an acidic solution. Although no specific dissolution rate standards exist, fibers with dissolution values in excess of 100 ng/cm2 hr are considered indicative of a non-biopersistent fiber.

Table I shows fiber melt chemistries for various comparative and inventive fiber samples.

TABLE I

| Example | SiO2 wt % | MgO wt % | Al2O3 wt % | CaO wt % | Fe2O3 wt % | Li2O wt % |
|---|---|---|---|---|---|---|
| C1 | 80.05 | 18.60 | 1.13 | 0.15 | 0.07 | 0 |
| 2 | 80.19 | 18.45 | 1.13 | 0.15 | 0.07 | 0.004 |
| 3 | 80.07 | 18.54 | 1.16 | 0.15 | 0.08 | 0.013 |
| 4 | 79.9 | 18.79 | 1.14 | 0.15 | 0.07 | 0.022 |
| 5 | 79.73 | 18.93 | 1.12 | 0.15 | 0.07 | 0.03 |
| 6 | 79.42 | 19.28 | 1.08 | 0.15 | 0.08 | 0.033 |
| 7 | 79.33 | 19.35 | 1.1 | 0.15 | 0.08 | 0.035 |
| 8 | 79.25 | 19.42 | 1.1 | 0.14 | 0.09 | 0.041 |
| C9 | 80.1 | 18.4 | 1.3 | 0.15 | 0.11 | 0 |
| 10 | 79.4 | 18.7 | 1.4 | 0.31 | 0.24 | 0.037 |
| 11 | 79.1 | 19 | 1.4 | 0.32 | 0.22 | 0.086 |
| 12 | 78.6 | 19.4 | 1.4 | 0.33 | 0.24 | 0.11 |
| 13 | 78.4 | 19.6 | 1.4 | 0.33 | 0.23 | 0.14 |
| 14 | 79.5 | 18.5 | 1.4 | 0.32 | 0.22 | 0.19 |
| 15 | 80.2 | 17.9 | 1.4 | 0.31 | 0.21 | 0.28 |
| 16 | 80.2 | 17.9 | 1.4 | 0; .31 | 0.21 | 0.36 |
| 17 | 80.5 | 17.6 | 1.4 | 0.29 | 0.21 | 0.39 |
| 18 | 80.2 | 17.9 | 1.4 | 0.31 | 0.21 | 0.38 |

Table II shows the green thickness (inches) blankets prepared from the fibers of Table I:

TABLE II

| Example | 24 hours/ 1260° C. Thickness Inches | 168 hours/ 1260° C. Thickness Inches | 24 hours/ 1400° C. Thickness Inches |
|---|---|---|---|
| C1 | 1.2 | | 1.2 |
| 2 | 1.2 | | 1.2 |
| 3 | 1.2 | | 1.2 |
| 4 | 1.2 | | 1.1 |
| 5 | 1.3 | | 1.2 |
| 6 | 1.2 | | 1.2 |
| 7 | 1.2 | | 1.2 |
| 8 | 1.1 | | 1.0 |
| 10 | | 1.14 | |
| 11 | | 1.17 | |
| 12 | | 1.16 | |
| 13 | | 1.14 | |
| 14 | | 1.03 | |
| 15 | | 1.21 | |
| 16 | | 1.17 | |
| 17 | | 1.05 | |
| 18 | | 1.08 | |

Table IIIa-1 and IIIa-2 show the green and fired densities (pcf) of blankets prepared from fibers of Table I. Table Mb shows the diameters, fiber index, green density, green thickness and initial tensile strength of fibers of Table I.

TABLE IIIa-1

| Example | 24 hours/ 1260° C. Green Density | 24 hours/ 1400° C. Green Density | 24 hours/ 1260° C. Fired Density | 24 hours/ 1400° C. Fired Density |
|---|---|---|---|---|
| C1 | 5.6 | 6.7 | 9.4 | 13.3 |
| 2 | 6.9 | 7.3 | 9.8 | 13.0 |
| 3 | 6.7 | 6.7 | 9.6 | 11.1 |
| 4 | 6.7 | 6.5 | 8.8 | 9.4 |
| 5 | 6.9 | 7.2 | 9.0 | 9.9 |
| 6 | 6.6 | 6.3 | 8.6 | 8.9 |
| 7 | 5.9 | 6.3 | 7.7 | 9.1 |
| 8 | 6.8 | 5.7 | 8.7 | 7.8 |

TABLE IIIa-2

| Example | 168 hours/ 1260° C. Green Density | 24 hours/ 1260° C. Fired Density |
|---|---|---|
| 10 | 7.2 | 11.2 |
| 11 | 6.8 | 9.3 |
| 12 | 7 | 9.3 |
| 13 | 7.8 | 9.4 |
| 14 | 8.4 | 9.5 |
| 15 | 8 | 9.4 |
| 16 | 7.1 | 8.3 |
| 17 | 9.4 | 10.7 |
| 18 | 8.1 | 9.4 |

TABLE IIIb

| Sample | Diameter (micron) | Fiber Index % | Green Density (pcf) | Green Thickness (inches) | Tensile Strength (psi) |
|---|---|---|---|---|---|
| C9 | 6.65 | 45 | 6.8 | 1.1 | 6.3 |
| 10 | 5.22 | 41.2 | 7.7 | 1.2 | 8.2 |
| 11 | 5.14 | 41.6 | 7.8 | 1.1 | 6.9 |
| 12 | 4.6 | 41.2 | 6.9 | 1.1 | 7.5 |
| 13 | 5.17 | 42.8 | 7.6 | 1.2 | 8.4 |
| 14 | 4.76 | 44.8 | 7.9 | 1 | 8.8 |
| 15 | 4.58 | 45 | 8.3 | 1.2 | 10.5 |
| 16 | 4.64 | 47.7 | 7.4 | 1.2 | 11.1 |
| 17 | 4.65 | 48.8 | 8.2 | 1.1 | 12.6 |
| 18 | | 49.6 | 8.5 | 1.1 | 13.1 |

Table IV shows the results for shrinkage for the fibers after exposure to 1260° C. and 1400° C. for 24 and 168 hours.

TABLE IV

| Example | Thickness Shrinkage 1260° C. 24 hours % | Linear Shrinkage 1260° C. 24 hours % | Thickness Shrinkage 1400° C. 24 hours % | Linear Shrinkage 1400° C. 24 hours % | Thickness Shrinkage 1260° C. 168 hours | Linear Shrinkage 1260° C. 168 hours |
|---|---|---|---|---|---|---|
| C1 | 30.9 | 6.9 | 35.8 | 11.4 | | |
| 2 | 21.8 | 5.2 | 31.3 | 9.4 | | |
| 3 | 22.9 | 5.4 | 29.7 | 7.4 | | |
| 4 | 18.8 | 3.7 | 23.6 | 4.9 | | |
| 5 | 18.0 | 3.3 | 21.0 | 4.1 | | |
| 6 | 18.5 | 2.9 | 22.5 | 4.5 | | |
| 7 | 18.1 | 3.4 | 23.6 | 4.4 | | |
| 8 | 16.5 | 3.3 | 20.3 | 4.2 | | |
| C9 | | 5.6 | | 11.5 | | |
| 10 | | 4.9 | | 6.2 | 28.5 | 5.3 |
| 11 | | 4.5 | | 5.6 | 20.5 | 4.9 |
| 12 | | 4.8 | | 5.2 | 17.5 | 4.8 |
| 13 | | 3.1 | | 3.5 | 11 | 3.4 |
| 14 | | 2.6 | | 2.8 | 7 | 2.6 |
| 15 | | 2.9 | | 3.4 | 9.5 | 3.1 |
| 16 | | 2.6 | | 3.3 | 8.5 | 3.3 |
| 17 | | 2.9 | | 3.1 | 7 | 3.1 |
| 18 | | 2.5 | | 3.2 | 8.5 | 2.7 |

Table IV shows that a magnesium-silicate inorganic fiber composition including a synergistic combination of lithium oxide as a component of the fiberization product results in lower linear shrinkage at both 1260° C. and 1400° C. as compared to magnesium-silicate inorganic fiber without the intended and lithium oxide addition.

Table V shows the results compression recovery after exposure to 1260° C. and 1400° C. for 24 and 168 hours, and solubility for the fibers of Table I:

TABLE V

| Example | Comp Rec 1260° C. 24 hours % | Comp Rec 1400° C. 24 hours % | Comp Rec 1260° C. 168 hours % | Solubility (k) ng/cm2 hr |
|---|---|---|---|---|
| C1 | 53.2 | 26.2 | | 587 |
| 2 | 53.7 | 27.5 | | 814 |
| 3 | 53.2 | 27.6 | | 757 |
| 4 | 53.6 | 31.5 | | 613 |
| 5 | 55.1 | 30.8 | | 616 |
| 6 | 56.4 | 30.1 | | 1053 |
| 7 | 56.9 | 29.3 | | 559 |
| 8 | 54.9 | 25.4 | | 723 |
| C9 | 42 | 17 | | 783 |
| 10 | 44 | 16 | 40 | 672 |
| 11 | 49 | 17 | 44 | 629 |
| 12 | 60 | 16 | 50 | |
| 13 | 57 | 17 | 45.5 | |
| 14 | 56 | 13 | 42.5 | 633 |
| 15 | 52 | 14 | 54 | 524 |
| 16 | 45 | 18 | 52.5 | 628 |
| 17 | 36 | 14 | 39.5 | 549 |
| 18 | 37 | 14 | 41 | 634 |

Table V shows that a magnesium-silicate inorganic fiber composition including an intended addition of lithium oxide as a component of the fiberization product results in an improvement in compression recovery at both 1260° C. and 1400° C. as compared to magnesium-silicate inorganic fiber without the intended and lithium oxide addition. The magnesium-silicate inorganic fiber composition including lithium oxide as a component of the fiberization product exhibits a compression recovery after exposure to 1260° C. for 24 hours of greater than about 30%. The magnesium-silicate inorganic fiber composition including lithium oxide as a component of the fiberization product exhibits a compression recovery after exposure to 1260° C. for 24 hours of greater than about 40%. The magnesium-silicate inorganic fiber composition including lithium oxide as a component of the fiberization product exhibits a compression recovery after exposure to 1260° C. for 24 hours of greater than about 50%. The magnesium-silicate inorganic fiber composition including lithium oxide as a component of the fiberization product exhibits a compression recovery after exposure to 1260° C. for 168 hours of greater than about 10%. The magnesium-silicate inorganic fiber composition including lithium oxide as a component of the fiberization product exhibits a compression recovery after exposure to 1260° C. for 168 hours of greater than about 20%. The magnesium-silicate inorganic fiber composition including lithium oxide as a component of the fiberization product exhibits a compression recovery after exposure to 1260° C. for 168 hours of greater than about 30%. The magnesium-silicate inorganic fiber composition including lithium oxide as a component of the fiberization product exhibits a compression recovery after exposure to 1400° C. for 24 hours of greater than about 30%. The magnesium-silicate inorganic fiber composition including lithium oxide as a component of the fiberization product exhibits a compression recovery after exposure to 1400° C. for 24 hours of greater than about 25%. The magnesium-silicate inorganic fiber composition including lithium oxide as a component of the fiberization product exhibits a compression recovery after exposure to 1400° C. for 24 hours of greater than about 20%. The magnesium-silicate inorganic fiber composition including lithium oxide as a component of the fiberization product exhibits a compression recovery after exposure to 1400° C. for 24 hours of greater than about 10%.

Table VI shows the results compressive strength after exposure to 1260° C. for 24 and 168 and 1400° C. for 24 hours for the fibers of Table I:

TABLE VI

| Example | Comp Strength 1260° C. 24 hours psi | Comp Strength 1400° C. 24 hours psi | Comp Strength 1260° C. 168 hours psi |
|---|---|---|---|
| C1 | 9.9 | 14.1 | |
| 2 | 12.7 | 13.4 | |
| 3 | 12.8 | 7.8 | |
| 4 | 10.4 | 6.2 | |
| 5 | 10.9 | 7.1 | |
| 6 | 10.2 | 5.9 | |
| 7 | 7.1 | 5.4 | |
| 8 | 7.4 | 3.2 | |
| C9 | 8 | 7.3 | |
| 10 | 13 | 6.2 | 9 |
| 11 | 8.7 | 3.4 | 7.9 |
| 12 | 6.9 | 2.5 | 8.4 |
| 13 | 8.6 | 2.8 | 8.1 |
| 14 | 5.8 | 1.8 | 5.7 |
| 15 | 8.6 | 2.5 | 9.3 |
| 16 | 5.6 | 2.1 | 8.5 |
| 17 | 4.9 | 1.8 | 8.1 |
| 18 | 4.6 | 1.8 | 8.2 |

While the inorganic fiber, thermal insulation, methods of preparing the inorganic fiber, and method of insulating articles using the thermal insulation have been described in connection with various embodiments, it is to be understood that other similar embodiments may be used or modifications and additions may be made to the described embodiments for performing the same function. Furthermore, the various illustrative embodiments may be combined to produce the desired results. Therefore, the inorganic fiber, thermal insulation, methods of preparing the inorganic fiber, and method of insulating articles using the thermal insulation should not be limited to any single embodiment, but rather construed in breadth and scope in accordance with the recitation of the appended claims. It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

The invention claimed is:

1. An inorganic fiber comprising the fiberization product of about 65 to about 86 weight percent silica, about 14 to about 35 weight percent magnesia, and greater than 0 to about 0.45 weight percent lithium oxide, wherein said inorganic fiber does not melt until exposed to a temperature of 1500° C. or greater.

2. The inorganic fiber of claim 1, comprising the fiberization product of about 65 to about 86 weight percent silica, about 14 to about 35 weight percent magnesia, and greater than 0 to about 0.35 weight percent lithium oxide.

3. The inorganic fiber of claim 2, comprising the fiberization product of about 65 to about 86 weight percent silica, about 14 to about 35 weight percent magnesia, and greater than 0 to about 0.3 weight percent lithium oxide.

4. The inorganic fiber of claim 3, comprising the fiberization product of about 65 to about 86 weight percent silica, about 14 to about 35 weight percent magnesia, and greater than 0 to about 0.25 weight percent lithium oxide.

5. The inorganic fiber of claim 4, comprising the fiberization product of about 65 to about 86 weight percent silica, about 14 to about 35 weight percent magnesia, and greater than 0 to about 0.2 weight percent lithium oxide.

6. The inorganic fiber of claim 5, comprising the fiberization product of about 65 to about 86 weight percent silica, about 14 to about 35 weight percent magnesia, and greater than 0 to about 0.175 weight percent lithium oxide.

7. The inorganic fiber of claim 6, comprising the fiberization product of about 65 to about 86 weight percent silica, about 14 to about 35 weight percent magnesia, and greater than 0 to about 0.15 weight percent lithium oxide.

8. The inorganic fiber of claim 7, comprising the fiberization product of about 65 to about 86 weight percent silica, about 14 to about 35 weight percent magnesia, and greater than 0 to about 0.1 weight percent lithium oxide.

9. The inorganic fiber of claim 8, comprising the fiberization product of about 65 to about 86 weight percent silica, about 14 to about 35 weight percent magnesia, and greater than 0 to about 0.075 weight percent lithium oxide.

10. The inorganic fiber of claim 9, comprising the fiberization product of about 65 to about 86 weight percent silica, about 14 to about 35 weight percent magnesia, and greater than 0 to about 0.05 weight percent lithium oxide.

11. The inorganic fiber of claim 10, comprising the fiberization product of about 65 to about 86 weight percent silica, about 14 to about 35 weight percent magnesia, and greater than 0 to about 0.01 weight percent lithium oxide.

12. The inorganic fiber of claim 11, comprising the fiberization product of about 65 to about 86 weight percent silica, about 14 to about 35 weight percent magnesia, and greater than 0 to about 0.005 weight percent lithium oxide.

13. The inorganic fiber of claim 1, comprising the fiberization product of about 65 to about 86 weight percent silica, about 14 to about 35 weight percent magnesia, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

14. The inorganic fiber of claim 1, comprising the fiberization product of about 70 to about 80 weight percent silica, about 20 to about 30 weight percent magnesia, and greater than 0 to about 0.45 weight percent lithium oxide.

15. The inorganic fiber of claim 14, comprising the fiberization product of about 70 to about 80 weight percent silica, about 20 to about 30 weight percent magnesia, and greater than 0 to about 0.35 weight percent lithium oxide.

16. The inorganic fiber of claim 15, comprising the fiberization product of about 70 to about 80 weight percent silica, about 20 to about 30 weight percent magnesia, and greater than 0 to about 0.3 weight percent lithium oxide.

17. The inorganic fiber of claim 16, comprising the fiberization product of about 70 to about 80 weight percent silica, about 20 to about 30 weight percent magnesia, and greater than 0 to about 0.25 weight percent lithium oxide.

18. The inorganic fiber of claim 17, comprising the fiberization product of about 70 to about 80 weight percent silica, about 20 to about 30 weight percent magnesia, and greater than 0 to about 0.2 weight percent lithium oxide.

19. The inorganic fiber of claim 18, comprising the fiberization product of about 70 to about 80 weight percent silica, about 20 to about 30 weight percent magnesia, and greater than 0 to about 0.175 weight percent lithium oxide.

20. The inorganic fiber of claim 19, comprising the fiberization product of about 70 to about 80 weight percent silica, about 20 to about 30 weight percent magnesia, and greater than 0 to about 0.15 weight percent lithium oxide.

21. The inorganic fiber of claim 20, comprising the fiberization product of about 70 to about 80 weight percent silica, about 20 to about 30 weight percent magnesia, and greater than 0 to about 0.1 weight percent lithium oxide.

22. The inorganic fiber of claim 21, comprising the fiberization product of about 70 to about 80 weight percent silica, about 20 to about 30 weight percent magnesia, and greater than 0 to about 0.075 weight percent lithium oxide.

23. The inorganic fiber of claim 22, comprising the fiberization product of about 70 to about 80 weight percent silica, about 20 to about 30 weight percent magnesia, and greater than 0 to about 0.01 weight percent lithium oxide.

24. The inorganic fiber of claim 23, comprising the fiberization product of about 70 to about 80 weight percent silica, about 20 to about 30 weight percent magnesia, and greater than 0 to about 0.005 weight percent lithium oxide.

25. The inorganic fiber of claim 14, comprising the fiberization product of about 70 to about 80 weight percent silica, about 20 to about 30 weight percent magnesia, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

26. The inorganic fiber of claim 1, comprising the fiberization product of about 75 to about 80 weight percent silica, about 20 to about 25 weight percent magnesia, and greater than 0 to about 0.45 weight percent lithium oxide.

27. The inorganic fiber of claim 26, comprising the fiberization product of about 75 to about 80 weight percent silica, about 20 to about 25 weight percent magnesia, and greater than 0 to about 0.35 weight percent lithium oxide.

28. The inorganic fiber of claim 27, comprising the fiberization product of about 75 to about 80 weight percent silica, about 20 to about 25 weight percent magnesia, and greater than 0 to about 0.3 weight percent lithium oxide.

29. The inorganic fiber of claim 28, comprising the fiberization product of about 75 to about 80 weight percent silica, about 20 to about 25 weight percent magnesia, and greater than 0 to about 0.25 weight percent lithium oxide.

30. The inorganic fiber of claim 29, comprising the fiberization product of about 75 to about 80 weight percent silica, about 20 to about 25 weight percent magnesia, and greater than 0 to about 0.2 weight percent lithium oxide.

31. The inorganic fiber of claim 30, comprising the fiberization product of about 75 to about 80 weight percent silica, about 20 to about 25 weight percent magnesia, and greater than 0 to about 0.15 weight percent lithium oxide.

32. The inorganic fiber of claim 31, comprising the fiberization product of about 75 to about 80 weight percent silica, about 20 to about 25 weight percent magnesia, and greater than 0 to about 0.1 weight percent lithium oxide.

33. The inorganic fiber of claim 32, comprising the fiberization product of about 75 to about 80 weight percent silica, about 20 to about 25 weight percent magnesia, and greater than 0 to about 0.075 weight percent lithium oxide.

34. The inorganic fiber of claim 33, comprising the fiberization product of about 75 to about 80 weight percent silica, about 20 to about 25 weight percent magnesia, and greater than 0 to about 0.05 weight percent lithium oxide.

35. The inorganic fiber of claim 34, comprising the fiberization product of about 75 to about 80 weight percent silica, about 20 to about 25 weight percent magnesia, and greater than 0 to about 0.01 weight percent lithium oxide.

36. The inorganic fiber of claim 35, comprising the fiberization product of about 75 to about 80 weight percent silica, about 20 to about 25 weight percent magnesia, and greater than 0 to about 0.005 weight percent lithium oxide.

37. The inorganic fiber of claim 26, comprising the fiberization product of about 75 to about 80 weight percent silica, about 20 to about 25 weight percent magnesia, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

38. The inorganic fiber of claim 1, comprising the fiberization product of about 76 to about 80 weight percent silica, about 20 to about 24 weight percent magnesia, greater than 0 to about 0.45 weight percent lithium oxide.

39. The inorganic fiber of claim 38, comprising the fiberization product of about 76 to about 80 weight percent silica, about 20 to about 24 weight percent magnesia, greater than 0 to about 0.35 weight percent lithium oxide.

40. The inorganic fiber of claim 39, comprising the fiberization product of about 76 to about 80 weight percent silica, about 20 to about 24 weight percent magnesia, greater than 0 to about 0.3 weight percent lithium oxide.

41. The inorganic fiber of claim 40, comprising the fiberization product of about 76 to about 80 weight percent silica, about 20 to about 24 weight percent magnesia, greater than 0 to about 0.25 weight percent lithium oxide.

42. The inorganic fiber of claim 41, comprising the fiberization product of about 76 to about 80 weight percent silica, about 20 to about 24 weight percent magnesia, greater than 0 to about 0.2 weight percent lithium oxide.

43. The inorganic fiber of claim 42, comprising the fiberization product of about 76 to about 80 weight percent silica, about 20 to about 24 weight percent magnesia, greater than 0 to about 0.15 weight percent lithium oxide.

44. The inorganic fiber of claim 43, comprising the fiberization product of about 76 to about 80 weight percent silica, about 20 to about 24 weight percent magnesia, greater than 0 to about 0.1 weight percent lithium oxide.

45. The inorganic fiber of claim 44, comprising the fiberization product of about 76 to about 80 weight percent silica, about 20 to about 24 weight percent magnesia, greater than 0 to about 0.075 weight percent lithium oxide.

46. The inorganic fiber of claim 45, comprising the fiberization product of about 76 to about 80 weight percent silica, about 20 to about 24 weight percent magnesia, greater than 0 to about 0.05 weight percent lithium oxide.

47. The inorganic fiber of claim 46, comprising the fiberization product of about 76 to about 80 weight percent silica, about 20 to about 24 weight percent magnesia, greater than 0 to about 0.01 weight percent lithium oxide.

48. The inorganic fiber of claim 47, comprising the fiberization product of about 76 to about 80 weight percent silica, about 20 to about 24 weight percent magnesia, greater than 0 to about 0.005 weight percent lithium oxide.

49. The inorganic fiber of claim 38, comprising the fiberization product of about 76 to about 80 weight percent silica, about 20 to about 24 weight percent magnesia, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

50. The inorganic fiber of claim 1, comprising the fiberization product of about 77 to about 80 weight percent silica, about 20 to about 23 weight percent magnesia, greater than 0 to about 0.45 weight percent lithium oxide.

51. The inorganic fiber of claim 50, comprising the fiberization product of about 77 to about 80 weight percent silica, about 20 to about 23 weight percent magnesia, greater than 0 to about 0.35 weight percent lithium oxide.

52. The inorganic fiber of claim 51, comprising the fiberization product of about 77 to about 80 weight percent silica, about 20 to about 23 weight percent magnesia, greater than 0 to about 0.3 weight percent lithium oxide.

53. The inorganic fiber of claim 52, comprising the fiberization product of about 77 to about 80 weight percent silica, about 20 to about 23 weight percent magnesia, greater than 0 to about 0.25 weight percent lithium oxide.

54. The inorganic fiber of claim 53, comprising the fiberization product of about 77 to about 80 weight percent silica, about 20 to about 23 weight percent magnesia, greater than 0 to about 0.2 weight percent lithium oxide.

55. The inorganic fiber of claim 54, comprising the fiberization product of about 77 to about 80 weight percent silica, about 20 to about 23 weight percent magnesia, greater than 0 to about 0.15 weight percent lithium oxide.

56. The inorganic fiber of claim 55, comprising the fiberization product of about 77 to about 80 weight percent silica, about 20 to about 23 weight percent magnesia, greater than 0 to about 0.1 weight percent lithium oxide.

57. The inorganic fiber of claim 56, comprising the fiberization product of about 77 to about 80 weight percent silica, about 20 to about 23 weight percent magnesia, greater than 0 to about 0.075 weight percent lithium oxide.

58. The inorganic fiber of claim 57, comprising the fiberization product of about 77 to about 80 weight percent silica, about 20 to about 23 weight percent magnesia, greater than 0 to about 0.05 weight percent lithium oxide.

59. The inorganic fiber of claim 58, comprising the fiberization product of about 77 to about 80 weight percent silica, about 20 to about 23 weight percent magnesia, greater than 0 to about 0.01 weight percent lithium oxide.

60. The inorganic fiber of claim 59, comprising the fiberization product of about 77 to about 80 weight percent silica, about 20 to about 23 weight percent magnesia, greater than 0 to about 0.005 weight percent lithium oxide.

61. The inorganic fiber of claim 50, comprising the fiberization product of about 77 to about 80 weight percent silica, about 20 to about 23 weight percent magnesia, and lithium oxide in any one of the following ranges: (i) greater than 0 to about 0.05 weight percent, (ii) greater than 0 to about 0.045 weight percent, (iii) about 0.002 to about 0.04 weight percent, (iv) from about 0.005 to about 0.04 weight percent, (v) from about 0.01 to about 0.04 weight percent, (vi) from about 0.02 to about 0.04 weight percent, (vii) from about 0.03 to about 0.04 weight percent, or (viii) from about 0.035 to about 0.04 weight percent.

62. The inorganic fiber of claim 1, comprising the fiberization product of about 78 to about 80 weight percent silica, about 20 to about 22 weight percent magnesia, greater than 0 to about 0.45 weight percent lithium oxide.

63. The inorganic fiber of claim 62, comprising the fiberization product of about 78 to about 80 weight percent silica, about 20 to about 22 weight percent magnesia, greater than 0 to about 0.35 weight percent lithium oxide.

64. The inorganic fiber of claim 63, comprising the fiberization product of about 78 to about 80 weight percent silica, about 20 to about 22 weight percent magnesia, greater than 0 to about 0.3 weight percent lithium oxide.

65. The inorganic fiber of claim 64, comprising the fiberization product of about 78 to about 80 weight percent silica, about 20 to about 22 weight percent magnesia, greater than 0 to about 0.25 weight percent lithium oxide.

66. The inorganic fiber of claim 65, comprising the fiberization product of about 78 to about 80 weight percent silica, about 20 to about 22 weight percent magnesia, greater than 0 to about 0.2 weight percent lithium oxide.

67. The inorganic fiber of claim 66, comprising the fiberization product of about 78 to about 80 weight percent silica, about 20 to about 22 weight percent magnesia, greater than 0 to about 0.15 weight percent lithium oxide.

68. The inorganic fiber of claim 67, comprising the fiberization product of about 78 to about 80 weight percent silica, about 20 to about 22 weight percent magnesia, greater than 0 to about 0.1 weight percent lithium oxide.

69. The inorganic fiber of claim 68, comprising the fiberization product of about 78 to about 80 weight percent silica, about 20 to about 22 weight percent magnesia, greater than 0 to about 0.075 weight percent lithium oxide.

70. The inorganic fiber of claim 69, comprising the fiberization product of about 78 to about 80 weight percent silica, about 20 to about 22 weight percent magnesia, greater than 0 to about 0.05 weight percent lithium oxide.

71. The inorganic fiber of claim 70, comprising the fiberization product of about 78 to about 80 weight percent silica, about 20 to about 22 weight percent magnesia, greater than 0 to about 0.01 weight percent lithium oxide.

72. The inorganic fiber of claim 71, comprising the fiberization product of about 78 to about 80 weight percent silica, about 20 to about 22 weight percent magnesia, greater than 0 to about 0.005 weight percent lithium oxide.

73. The inorganic fiber of claim 1, wherein said fiberization product further comprises a viscosity modifier selected from the group consisting of alumina, boria, and mixtures thereof.

74. The inorganic fiber of claim 1, containing 1 weight percent or less calcia.

75. The inorganic fiber of claim 1, wherein said inorganic fiber has a compression recovery of at least 10% after exposure to a temperature of 1260° C. for 24 hours.

76. The inorganic fiber of claim 1, wherein said inorganic fiber has compression recovery of at least 30% after exposure to a temperature of 1260° C. for 168 hours.

77. The inorganic fiber of claim 1, wherein said inorganic fiber has a compression recovery of at least 10% after exposure to a temperature of 1400° C. for 24 hours.

78. The inorganic fiber of claim 1, wherein said inorganic fiber has a compression strength of at least 4 psi after exposure to a temperature of 1260° C. for 24 hours.

79. The inorganic fiber of claim 1, wherein said inorganic fiber has an average diameter of greater than about 3.5 to about 7.5 microns.

80. The inorganic fiber of claim 1, wherein said fiber exhibits a shrinkage of 5% or less at 1260° C.

81. The inorganic fiber of claim 1, wherein said fiber exhibits a shrinkage of 5% or less at 1400° C.

82. A method of insulating an article, including disposing on, in, near or around the article, a thermal insulation material comprising a plurality of inorganic fibers of claim 1.

83. An inorganic fiber containing article comprising at least one of bulk fiber, blankets, blocks, boards, caulking compositions, cement compositions, coatings, felts, mats, moldable compositions, modules, papers, pumpable compositions, putty compositions, sheets, tamping mixtures, vacuum cast shapes, vacuum cast forms, or woven textiles, braids, cloths, fabrics, ropes, tapes, sleeving, wicking, said fiber containing article comprising the fiberization product of claim 1.

* * * * *